United States Patent [19]
Taylor

[11] Patent Number: 5,968,208
[45] Date of Patent: Oct. 19, 1999

[54] NEGATIVE DYES AND COLORATION PROCESS USING THEM

[75] Inventor: John Anthony Taylor, Manchester, United Kingdom

[73] Assignee: Zeneca Limited, London, United Kingdom

[21] Appl. No.: 09/068,550

[22] PCT Filed: Oct. 30, 1996

[86] PCT No.: PCT/GB96/02633

§ 371 Date: Jun. 8, 1998

§ 102(e) Date: Jun. 8, 1998

[87] PCT Pub. No.: WO97/19137

PCT Pub. Date: May 29, 1997

[30] Foreign Application Priority Data

Nov. 17, 1995 [GB] United Kingdom .................. 9523575

[51] Int. Cl.⁶ .............................. C09B 62/04; D06P 3/66
[52] U.S. Cl. ................ 8/543; 8/549; 544/193.2; 544/194; 544/204; 544/212; 544/217; 534/635
[58] Field of Search ...................... 544/180–218; 8/543, 549; 534/635

[56] References Cited

U.S. PATENT DOCUMENTS 4,038,267  7/1977  Sueda et al. .
4,230,852  10/1980  Sueda et al. .

FOREIGN PATENT DOCUMENTS

A-1458118  12/1976  United Kingdom .

*Primary Examiner*—Margaret Einsmann
*Attorney, Agent, or Firm*—Oblon, Spivak, McClelland, Maier & Neustadt, P.C.

[57] ABSTRACT

A process for coloration of a substrate comprising applying thereto at a pH above 7 a water-soluble reactive dye comprising at least three chromophoric groups linked to a polyamine. Also claimed are dyes suitable for use in the process.

3 Claims, No Drawings

NEGATIVE DYES AND COLORATION PROCESS USING THEM

This invention relates to reactive dyes, their preparation and use.

The use of a reactive dyes for colouring cellulosic substrates has been known for many years. Environmental legislation has lead to stricter controls on dyehouse effluent, e.g. waters containing salt and unfixed dye, and effluent disposal now represents a major cost to dyehouses. To reduce such costs there is a need for reactive dyes which can be used in a way which produces less effluent, for example dyes having high fixation efficiency and/or requiring less salt during the fixation process. Reactive dyes having these properties and the ability to build-up to high depths of shade would be particularly valuable.

According to the present invention there is provided a process for the coloration of a substrate comprising applying thereto at a pH above 7 a water-soluble reactive dye comprising at least three chromophoric groups linked to a polyamine.

The water-soluble reactive dye preferably comprises 3, 4 or 5, more preferably 3 or 4, especially 3 chromophoric groups linked to a polyamine. The chromophoric groups can be different from each other, but they are preferably identical to each other.

The polyamine to which the chromophoric groups are linked preferably consists of at least three amino groups, more preferably three to six, especially three or four amino groups, joined together by optionally substituted aliphatic groups. The amino groups are preferably attached to one or two —$CH_2$— groups (as illustrated in —HN—$CH_2$— and —$CH_2$—N(-)—$CH_2$—). Preferred polyamines are linear polyamines, for example of the formula (I), or branched polyamines, for example of formula (II), wherein each $R^1$ independently is H or optionally substituted alkyl, n has a value of 2 to 10, preferably 2 to 6, more preferably 2, and p has a value of 2 to 6, more preferably 2 or 3:

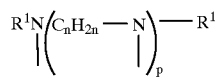
(I)

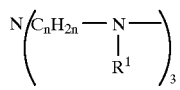
(II)

Reactivity of the dyes is preferably provided by means of a reactive triazine group linking the chromophoric groups to amino groups in the polyamine. The reactive triazine group is preferably an s-triazine group having a labile atom or group at the 2-,4- or 6-position, for example a group of the formula:

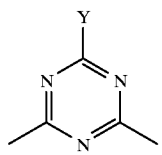

wherein Y is a labile atom or group.

In light of the above preference for amino groups being attached to —$CH_2$— groups and the chromophoric groups being linked to the nitrogen atoms byimeans of reactive triazine groups it is preferred for the water-soluble reactive dyes to contain at least 3, more preferably 3,4 or 5, especially 3 or 4, more especially 3 groups of the formula (III):

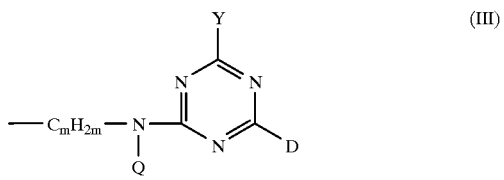
(III)

wherein:
m is from 1 to 6;
Q is H or optionally substituted alkyl or alkylene;
Y is a labile atom or group; and
D is a chromophoric group.

Preferably m is 2, 3 or 4, more preferably 2 or 3, especially 2.

Q is preferably H, $C_{1-4}$-alkyl or $C_{2-4}$-alkylene, more preferably H, methyl or —$CH_2CH_2$—, especially H or —$CH_2CH_2$—.

As will be understood, when Q is H or optionally substituted alkyl the chromophoric group D is a chain terminating chromophoric group and when Q is optionally substituted alkylene then D is a pendent chromophoric group. Thus a dye comprising three chromophoric groups linked to diethylene triamine would have two terminating chromophoric groups and one pendent chromophoric group. When the polyamine is tris(2-aminoethyl)amine the corresponding dye would have three terminating chromophoric groups and zero pendent chromophoric groups.

One preferred class of dye, which presents one aspect of the invention, is of the formula $N(Z)_3$ wherein each Z independently is of the formula (III) defined above, with the proviso that Q is H or optionally substituted alkyl, preferably H or $C_{1-4}$-alkyl, especially H.

A second preferred class of dye which may be used in the process is of the formula (IV):

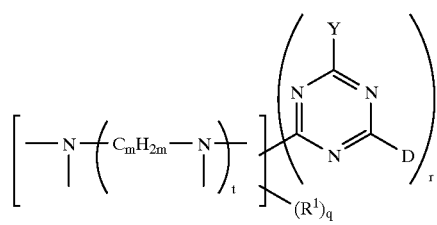
(IV)

wherein
t is 2, 3 or 4;
r is 3, 4 or 5;
q is (t+3)−r; and
Y, $R^1$, m and D are as hereinbefore defined.

Dyes of formula (III) wherein at least one D is a chromophore other than an azo chromophore form a further feature of the invention.

$R^1$ is preferably H or $C_{1-4}$-alkyl, more preferably H.

By a labile atom or group it is meant an atom or group which is bound by a chemical bond to the triazine nucleus, which atom or group is displaceable by a hydroxyl group of cellulose under mildly alkaline aqueous conditions to form a covalent bond between the triazine nucleus and cellulose. As examples of such atoms or groups there may be mentioned halogen atoms, for example F and Cl; sulphonic acid groups; thiocyano groups; quaternary ammonium groups, for example trialkylammonium groups and optionally substituted pyridinium groups, for example 3- and 4-carboxy pyridinium groups.

When $R^1$, Q or an aliphatic group is substituted the substituent is preferably selected from hydroxy, amino, halo, carboxy and sulpho.

In a preferred embodiment dyes of the invention are free from —$SO_2CH=CH_2$ groups and groups which are convertible on treatment with aqueous alkali to —$SO_2CH=CH_2$ groups (e.g. —$SO_2CH_2CH_2OSO_3H$, —$SO_2CH_2CH_2SSO_3H$, —$SO_2CH_2CH_2OPO_3H$ and —$SO_2CH_2CH_2Cl$). Preferably the only reactive groups in dyes of the invention are reactive triazine groups.

The chromophoric groups preferably each independently comprise an azo, anthraquinone, phthalocyanine, triphenodioxazine or formazan group.

Preferred azo groups are monoazo and disazo groups. Preferred monoazo groups are formula L—N=N—$L^1$—$NR^1$-wherein L is an aryl or heteroaryl group, $L^1$ is an arylene group and $R^1$ is as hereinbefore defined.

It is preferred that each aryl or arylene group independently is a mono- or di-cyclic aryl or arylene group. Preferred aryl groups are optionally substituted phenyl and optionally substituted naphthyl, and preferred arylene groups are optionally substituted phenylene and optionally substituted naphthylene. Preferred heteroaryl groups are pyridonyl and pyrazolonyl.

A first preferred monoazo group is of the Formula (2) or salt thereof:

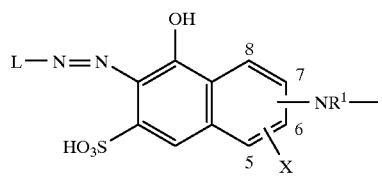

(2)

wherein:

X is H or sulpho; and

L and $R^1$ are as hereinbefore defined.

L is preferably optionally substituted phenyl or naphthyl, especially a phenyl or naphthyl group having at least one sulpho substituent. Further optional substituents which may be present on L include a halogen atom, especially chlorine; an alkyl radical, especially $C_{1-4}$-alkyl, more especially methyl; an acylamino radical, especially acetylamino, benzamido or sulphonated benzamido; amino; hydroxy; and an alkoxy radical, especially $C_{1-4}$-alkoxy, more especially methoxy.

As examples of phenyl groups having at least one sulpho substituent there may be mentioned 2-, 3- or 4-sulphophenyl; 2-sulpho-4-nitrophenyl; 2-sulpho-5-nitrophenyl; 4-sulpho-2-methylphenyl; 5-sulpho-2-methylphenyl; 2-sulpho-4-methylphenyl; 5-sulpho-2-methoxyphenyl; 2-sulpho-4-methoxyphenyl; 4-sulpho-2-chlorophenyl; 5-acetamido-2-sulphophenyl; 5-sulpho-2-carboxyphenyl; 2,4-disulphophenyl; 2,5-disulphophenyl; and 3,5-disulphophenyl.

As examples of naphthyl groups having at least one sulpho substituent there may be mentioned 1-sulphonaphth-2-yl; 1,5-disulphonaphth-2-yl; 1,5,7-trisulphonaphth-2-yl;

3,6,8-trisulphonaphth-2-yl; 5,7-disulphonaphth-2-yl; 6-sulphonaphth-2-yl; 4-, 5-, 6-, or 7-sulphonaphth-1-yl; 4,8-disulphonaphth-1-yl; 3,8-disulphonaphth-1-yl; 2,5,7-trisulphonaphth-1-yl; and 3,5,7-trisulphonaphth-1-yl.

Preferred optional substituents which may be present on $L^1$ are those mentioned above for L.

In groups of Formula (2), —$NR^1$—is preferably at the 6-, 7- or 8-position, especially the 6- or 8-position. When —NR'— is at the 8-position, it is preferred that X is a sulpho group at the 5- or 6-position.

A second preferred monoazo group is of the Formula (3) or a salt thereof:

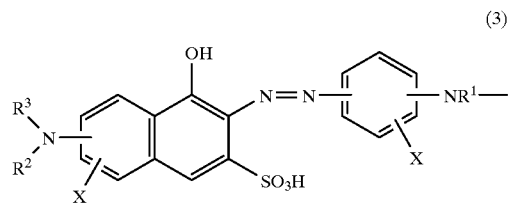

(3)

wherein:

$R^3$ is H or $C_{1-4}$-alkyl;

$R^2$ is H, $C_{1-4}$-alkyl, $C_{1-4}$-alkanoyl or optionally substituted benzoyl, especially benzoyl or sulphobenzoyl, acetyl, propanoyl, n-butanoyl or iso-butanoyl; and X and $R^1$ are as hereinbefore defined.

A third preferred monoazo group is of the Formula (4) or salt thereof:

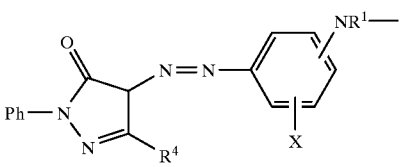

(4)

wherein:

pH is an optionally substituted phenyl group, especially sulphophenyl;

$R^4$ is CN, $CH_3$ or carboxy; and $R^1$ and X are as hereinbefore defined.

A preferred disazo group is of Formula (5) or salt thereof:

L—N=N—A—N=N—B—$NR^1$— (5)

wherein:

A and B are each independently optionally substituted phenylene or naphthylene; and $R^1$ and L are as hereinbefore defined.

It is preferred that B is optionally substituted naphthylene and A is optionally substituted phenylene. The optional substituents which may be present on A or B are preferably independently selected from halo, especially chloro; alkoxy, especially $C_{1-4}$-alkoxy; alkyl, especially methyl; sulpho; carboxy; hydroxy; amino; acylamino especially as acetamido, benzamido and sulphonated benzamido, and pyrimidinylamino or triazinylamino cellulose-reactive groups.

As Examples of groups represented by A and B there may be mentioned phenylene, 2-methyl-1,4-phenylene, sulphophenylene, ureidophenylene, 7-sulpho-1, 4-naphthylene, 6-sulpho-1,4-naphthylene; 8-sulpho-1,4-naphthylene and 6-hydroxy-4-sulpho-1,5-naphthylene.

A preferred anthraquinone group is of the Formula (6) or a salt thereof:

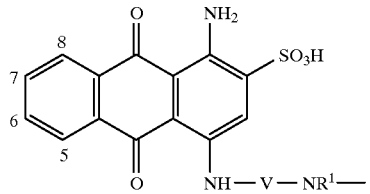

(6)

wherein the anthraquinone nucleus optionally contains a sulphonic acid group in the 5-, 6-, 7-, or 8-position; V is a divalent organic linking group, preferably of the benzene series; and $R^1$ is as hereinbefore defined.

V is preferably phenylene, diphenylene, or 4,4'-divalent stilbene or azobenzene radicals which are optionally sulphonated. It is preferred that V contains one sulphonic acid group for each benzene ring present therein.

A preferred phthalocyanine group is of the Formula (7) or a salt thereof:

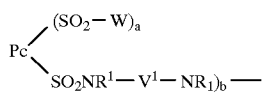

(7)

wherein Pc is a metallo-phthalocyanine nucleus, preferably copper or nickel phthalocyanine; each $R^1$ is as hereinbefore defined; each W independently is a hydroxy or a substituted or unsubstituted amino group, $V^1$ is a divalent organic linking group, preferably a $C_{1-4}$-alkylene or phenylene linking group; and a and b are each independently 1, 2 or 3 provided that a+b is not greater than 4.

A preferred tridphenodioxazine group is of the Formula (8) or a salt thereof:

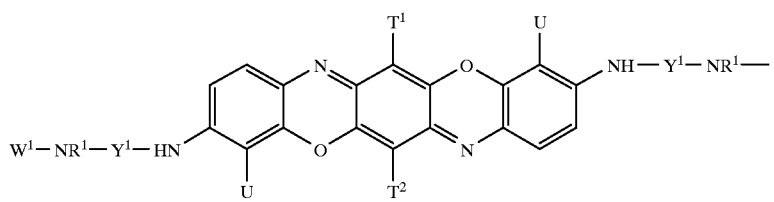

(8)

wherein:
each $Y^1$ independently is a covalent bond, $C_{2-4}$-alkylene, phenylene or sulphophenylene;
U is H or $SO_3H$;
$W^1$ is an optionally substituted triazine group;
$T^1$ and $T^2$ are halo, especially chloro, $C_{1-4}$-alkyl, or $C_{1-4}$-alkoxy; and each
$R^1$ independently is as hereinbefore defined.
Each $Y^1$ is preferably $-C_2H_4-$ or $-C_3H_6-$, U is preferably $SO_3H$, and
$T^1$ and $T^2$ are preferably Cl, methyl or ethyl.

$W^1$ is preferably a triazine group having one or two a labile atoms or groups.

A preferred formazan group is of the Formula (9) or a salt thereof:

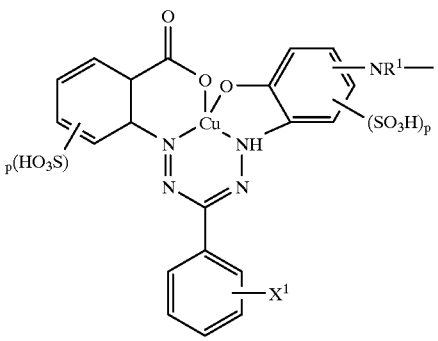

(9)

wherein:
$X^1$ is H, $SO_3H$ or Cl;
each p independently has a value of 0, 1 or 2; and
$R^1$ is as hereinbefore defined;
provided that the formazan group has at least one, and preferably at least two, sulpho groups.

It is preferred that each p has a value of 1.

Dyes according to the invention may be prepared by a process comprising condensation of one or more reactive dyes having at least two reactive groups with a polyamine, preferably in a liquid medium. It is preferred that the condensation is performed at 10° C. to 70° C., especially 20 to 50° C., more especially 20 to 40° C. The liquid medium is preferably an aqueous medium, especially water. The condensation is preferably performed at a pH in the range 5.5 to 11, preferably 5.5 to 9.5, more preferably 6 to 9, especially 7.5 to 8.5. It is preferred to use an excess of the reactive dye, for example 3 to 5 moles of the reactive dye per mole of polyamine when the polyamine is tris(aminoalkyl)amine, more preferably 2.5 to 3.5, especially about 3.

Examples of suitable polyamines which can be used in the process include tris(2-aminoethyl)amine, diethylene triamine, dipropylene triamine, triethylene tetramine, mono-N-(2-aminoethyl) dipropylene triamine, N,N'-bis(3-aminopropyl)butylenediamine, mono-N-(2-hydroxyethyl) triethylene tetramine, tetraethylene pentamine and pentaethylene hexamine. Preferably the polyamine has a molecular weight below 599.

Although dye formulae have been shown in the form of their free acid in this specification, the invention also includes dyes and processes using dyes in the salt form, particularly their salts with alkali metals such as the potassium, sodium, lithium or mixed sodium/lithium salt.

The process for coloration is preferably performed at a pH of 7.1 to 13, more preferably 10 to 12. pH levels above 7 can be achieved by performing the process for coloration in the presence of an acid-binding agent.

The substrate is preferably a natural and artificial textile materials containing amino or hydroxyl groups, for example textile material such as wool, silk, polyamides and modified polyacrylonitrile fibres, and more preferably a cellulosic textile material, especially cotton. For this purpose the dyes can be applied to the textile materials at a pH above 7 by, for example, exhaust dyeing, padding or printing. Textile materials are coloured bright shades and possess good fastness to light and to wet treatments such as washing.

The new dyes are particularly valuable for colouring cellulosic textile materials. For this purpose the dyes are preferably applied to the cellulosic textile material at a pH above 7 in conjunction with a treatment with an acid-binding agent.

Preferred acid-binding agents include alkali metal carbonates, bicarbonates, hydroxides, metasilicates and mixtures thereof, for example sodium bicarbonate, sodium carbonate, sodium metasilicate, sodium hydroxide and the corresponding potassium salts. The dyes benefit from excellent build-up and high fixation.

The new dyes can be applied to textile materials containing amine groups, such as wool and polyamide textile materials, from a mildly alkaline dyebath. The dyeing process can be carried out at a constant or substantially constant pH, that is to say the pH of the dyebath remains constant or substantially constant during the dyeing process, or if desired the pH of the dyebath can be altered at any stage of the dyeing process.

The dyes may be in liquid or solid form, for example in granular or powdered form.

The invention is illustrated but not limited by the following Examples in which all parts and percentages are by weight unless stated otherwise.

EXAMPLE 1

Preparation of

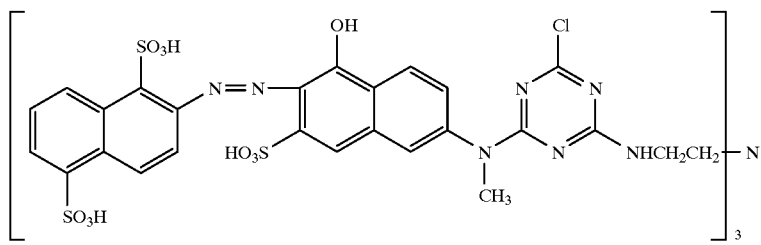

Stage a)

1-hydroxy-2-( 1,5-disulphonaphth-2-ylazo)-6-[N-(4,6-dichloro-s-triazin-2-yl)methylamino]-naphthalene-3-sulphonic acid was prepared by coupling diazotised 2-aminonaphthalene-1,5-disulphonic acid onto N-acetyl-2-methylamino-5-hydroxynaphthalene-7-sulphonic acid, removing the acetyl group by heating to 80° C. in 2 N sodium hydroxide solution and reacting the resultant dyebase with cyanuric chloride at 0–5° C.

Stage b)

Tris(β-aminoethyl)amine (1.246 g) was added to a stirred solution of the product from stage a) (36 g, Ml 1221) in water (250 ml). The mixture was stirred at 50° C., pH 8.5, for 2 hours, cooled and methylated spirits was added slowly with stirring. The precipitated dye was collected and dried to give the title product (23 g, Ml 2914) having a λmax at 484 nm.

Stage c)-Dyeing

The title product was applied to cotton by exhaust dyeing in aqueous soda ash and was found to have good build-up and high fixation efficiency.

EXAMPLE 2

Preparation of

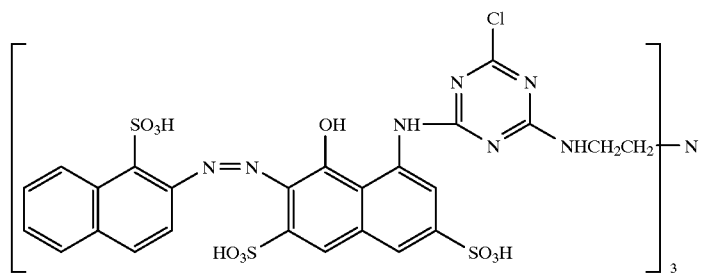

Stage a)

2-(1-sulphonaphthyl-2-azo)-8-(4,6-dichloro-s-triazin-2-ylamino)-1-hydroxy naphthalene-3,6-disulphonic acid was prepared by condensing cyanuric chloride with 1-hydroxy-2-(1-sulphonaphthyl-2-azo)-8-aminonaphthalene-3,6-disulphonic acid at 0–5° C. and pH6.

Stage b)

Tris(β-aminoethyl)amine (0.684 g, 96% strength) was added to a stirred solution of the product from stage a) (0.0148 m) in water (250 ml). The mixture was stirred at 50° C. and pH 8.5 for 5 hours. A further portion of the product from stage a) (0.0029 mol) was added and the mixture was stirred for a further 2 hours at 50° C. The mixture was allowed to cool to room temperature, salt solution (8% w/v) was added with stirring and the resultant precipitate collected and dried to give the title product (11.0 g, 76% strength) having a λmax at 518 nm and εmax of 102,166.

Stage c)-Dyeing

The title product was applied to cotton by exhaust dyeing in presence of salt and soda ash and was found to have good build-up and fixation.

lar amount of diethylene triamine. The resultant product had a λmax at 518 nm.

Stage b)-Dyeing

The product from stage a) was applied to cotton at 90° C. in the presence of salt and soda ash and was found to have good build-up and fixation efficiency.

EXAMPLE 5

The method of Example 3 was repeated except that in place is tris-(β-aminoethyl)amine there was used an equimolar amount of diethylene triamine. The resultant product had a λmax at 516 nm.

Stage b)-Dyeing

The product from stage a) was applied to cotton in presence of salt and soda ash and was found to have good build up.

EXAMPLE 6

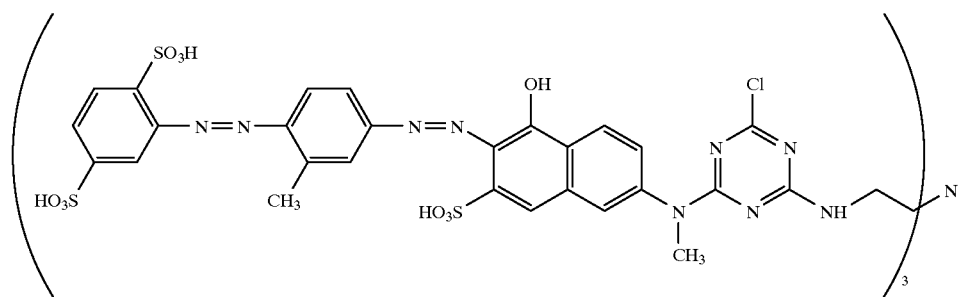

EXAMPLE 3

Preparation of

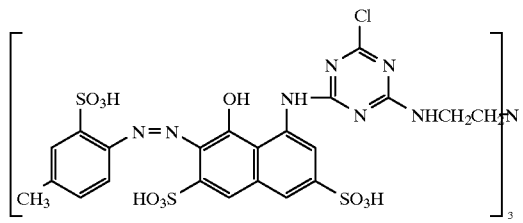

Stage a)

1-hydroxy-2-(2-sulpho-4-methyl phenyl azo)-8-(4,6-dichloro-s-triazin-2-ylamino)naphthalene-3,6-disulphonic acid was prepared by coupling diazotised 2-amino-5-methylbenzene sulphonic acid onto 1-hydroxy-8-(dichloro-s-triazinylamino) naphthalene-3,6-disulphonic acid.

Stage b)

Tris(β-aminoethyl)amine (1.01 g) was added to a solution of the product from stage a) (43 g, Ml 1599) in water (300 ml). The mixture was stirred at 50° C. and pH 8.5 for 2 hours then allowed to cool to room temperature. Methylated spirits was added slowly with stirring and the resultant precipitate collected and dried to give the title product (30 g) having a λmax at 516 nm.

Stage c)-Dyeing

The title product was applied to cotton by exhaust dyeing in the presence of salt and soda ash and was found to have good fixation efficiency.

EXAMPLE 4

Stage a)

The method of Example 2 was repeated except that in place is tris-(β-aminoethyl)amine there was used an equimo- Stage a)

A solution of 1-hydroxy-6-[N-methyl-N-(dichloro-s-triazinyl)]-amino-2-[3-methyl-4-(2,5-disulphophenyl azo) phenyl azo] naphthalene-3-sulphonic acid (0.0248 mmol) and tris(β-aminoethyl)amine (0.0083 mmol) was stirred at pH 8.5 and 45–50° for 6 hours. On cooling, potassium chloride solution (7.5% w/v) was added and the precipitate was collected and dried to give the title product having a λmax at 522 nm, εmax 128,000.

Stage b)

The product from stage a) was applied to cotton in presence of soda ash and NaCl and was found to have good fixation and build-up.

EXAMPLE 7

Preparation of a reactive dye of the formula (10):

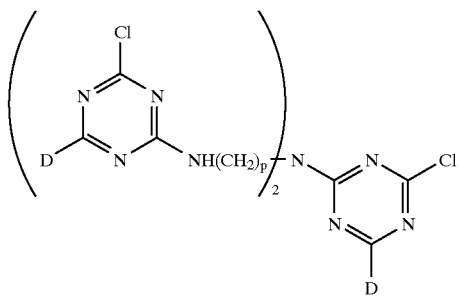

(10)

wherein p is 2 and D is a 1-hydroxy-2-(2'-sulphophenylazo)-3,6-disulpho naphthyl-8-amino group.

Stage a)

Diethylene triamine (8.7 mmol) was added to a solution of 8-dichloro-s-triazinylamino-1-hydroxy-2(2'-sulphophenylazo)naphthalene-3,6-disulphonic acid (27.3 mmol) in water (200 ml). The mixture was stirred at 50° C. and pH 8.5 for 8 hours. On cooling the solution was added to methylated spirits (1 litre) and the precipitated solid was collected and dried to give the title product (7.8 mmol) having a λmax at 506 nm.

Stage b)-Dyeing

The title product was applied to cotton by exhaust dyeing in presence of NaCl and soda ash.

EXAMPLE 8

Preparation of a dye of formula (10) wherein p is 2 and D is of the formula

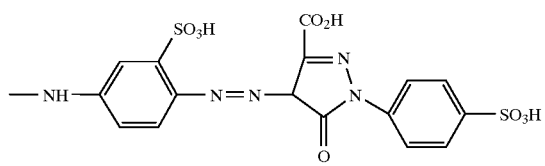

Stage a)

1-(4-sulphophenyl)-3-carboxy-4-(2-sulpho-4-dichloro-s-triazinylamino-phenylazo) pyrazol-5-one was prepared by condensation of 1-(4-sulphophenyl)-3-carboxy-4-(4-amino-2-sulphophenyl azo) pyrazol-5-one with cyanuric chloride at pH 6.5.

Stage b)

Diethylene triamine (8.3 mmol) was added to a solution of the product from stage a) (26.3 mmol) in water (200 ml). After stirring for 4 hours at 50° C. and pH 8.5 the mixture was added, with stirring, to methylated spirits. The precipitate was filtered-off and dried to give the title product (4.5 mmol) having a λmax at 449 nm.

Stage c)-Dyeing

The title product was applied to cotton by exhaust dyeing in presence of salt an soda ash and was found to have good build up and fixation.

EXAMPLE 9

Preparation of a dye of formula (10) wherein p is 2 and D is of the formula:

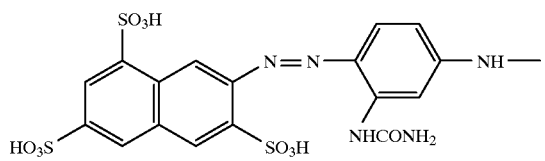

Stage a)

N-(dichloro-s-triazinyl)-3-ureido-4-(3, 6, 8-trisulpho naphthyl-2-azo) aniline was prepared by condensation, at 0° to 5° and pH 6.5, of cyanuric chloride with 3-ureido-4-(3, 6,8-trisulphonaphthyl-2-azo) aniline.

Stage b)

Diethylenetriamine (5.4 mmol) was added to a solution of the product from stage a) (1 6.2 mmol) in water (200 ml). The mixture was stirred at 50° C. and pH 8.5 for 15 hours.

After cooling to room temperature the mixture was added to methylated spirits (740 p, 1 litre) and the precipitated solid collected and dried to give the title product (4 mmol) having a λmax at 431 nm.

Stage c)

The title product was applied to cotton by exhaust dyeing in presence of soda ash and NaCl and was found to have good fixation.

EXAMPLE 10

Stage a)

The method of Example 3, stage b), was followed except that in place of the product from step a) there was used 1-hydroxy-2-(2'-sulpho-5'-acetylaminophenylazo)-8-(4,6-dichloro-s-triazin-2-ylamino) naphthalene-3,6-disulphonic acid. The resultant reactive dye had a λmax at 505 nm.

Stage b)-Dyeing

The title product was applied to cotton by exhaust dyeing in presence of NaCl and soda ash and was found to have good fixation.

EXAMPLE 11

Preparation of a dye of Formula (10) wherein p is 2 and D is of the formula:

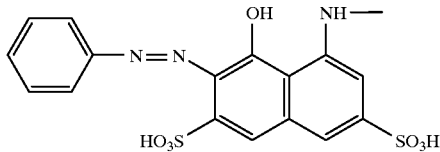

The method of Example 7 was repeated except that in place of 8-dichloro-s-triazinylamino-1-hydroxy 2(2'-sulphophenylazo)naphthalene-3,6-disulphonic acid there was used 1-hydroxy-2-(phenylazo)-8-(4,6-dichloro-s-triazine-2-ylamino)naphthalene-3,6-disulphonic acid.

The resultant dye had a λmax at 509 nm and was found to have good build-up and fixation when applied to cotton by exhaust dyeing.

EXAMPLE 12

Preparation of a dye of Formula (10) wherein p is 2 and D is of the formula:

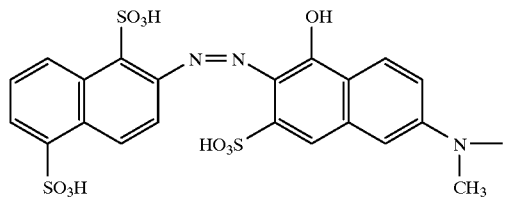

The method of Example 7 was repeated except that in place of 8-dichloro-s-triazinylamino-1-hydroxy 2(2'-sulphophenylazo)naphthalene-3,6-disulphonic acid there was used 6-(N-dichloro-s-triazinylmethylamino)-1-hydroxy-2-(1,5-disulphonaphthyl-2-azo)naphthalene-3-sulphonic acid.

The resultant dye had a λmax at 484 nm and was found to have good build-up and fixation when applied to cotton by exhaust dyeing.

EXAMPLE 13

The method of Example 2 was repeated except that in place of tris (β-aminoethyl)amino there was used an equivalent amount of an amine of the formula $H_2N—(CH_2)_6—NH—(CH_2)_6—NH_2$.

The resultant dye had a λmax at 516 nm and was found to have good build-up and fixation when applied to cotton by exhaust dyeing.

EXAMPLE 14

Preparation of a reactive dye of the formula (10) wherein p is 6 and D is a 1-hydroxy-2'-(2-sulphophenylazo)-3,6-disulphonaphthyl-8-amino group The method of Example 7 was repeated except that in place of diethylene triamine there was used an equivalent amount of an amine of the formula $H_2N(CH_2)_6NH(CH_2)_6NH_2$.

The resultant dye had a λmax at 516 nm and was found to have good build-up and fixation when applied to cotton by exhaust dyeing.

EXAMPLE 15

Preparation of a dye of the formula (11):

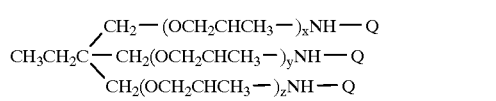

(11)

wherein x+y+z is from 5 to 6 and Q is of the formula (12):

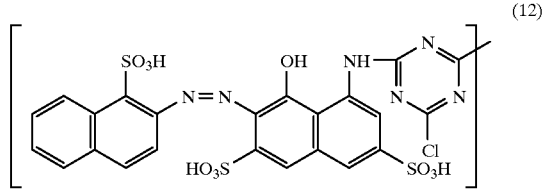

(12)

A solution of 8-dichloro-s-triazinyl amino-1-hydroxy-2-(1-sulphonaphth-2-ylazo) naphthalene-3,6-disulphonic acid (Ml 1705, 33 g) was mixed with Jeffamine™ T403 (from Texaco Corporation) (Ml 440, 0.0059 m) and the solution stirred at pH 8.5 and 60° C. for 15 hours. After allowing to cool, salt (20% w/v) was added to the stirred solution, the precipitated solid was collected, desalinated (visking tubing) and reprecipitated with methylated spirits to give the title product (11.0 g, Ml 3000) λmax 523 nm; εmax 106000.

EXAMPLE 16

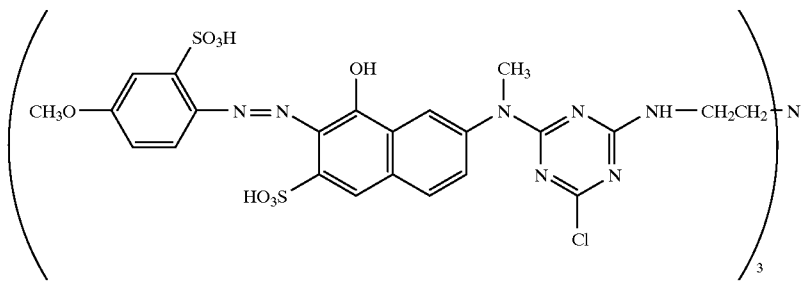

A solution of 1-hydroxy-2-(2-sulpho-4-methoxyphenylazo)-7-N-(4,6-dichloro-s-triazinyl) methylaminonaphthalene-3-sulphonic acid (0.033 moles) was dissolved in water at pH7. Tris (β-aminoethyl)amine (1.46 g, 0.01 moles) was added to the solution and the mixture was stirred at 50° C. and pH10 for 3 hours. The mixture was allowed to cool and screened to remove any insoluble material. Salt (15% w/v) was added and the resulting precipitate was collected and dried to give the title product as its sodium salt (14.3 g, Ml 2000), having λmax at 502 nm.

EXAMPLE 17

Preparation of

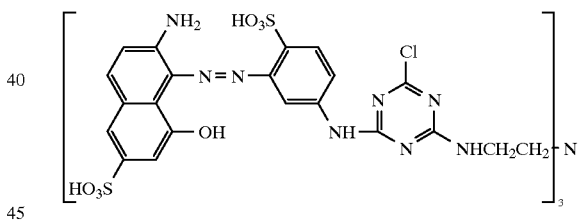

Stage (a)

Cyanuric chloride (6 g) dissolved in acetone was added to ice/water with vigorous stirring followed by 2,4-diaminobenzene sulphonic acid. The mixture was stirred at 0° C. and pH3 for 1.5 hours, screened and the pH adjusted to 2.0. 2 N sodium nitrite solution (1 6.5 ml, 0.033 moles) was added at 0° C. and pH2. After 2 hours, 1-hydroxy-7-aminonaphthalene-3-sulphonic acid (0.03 moles) was added; the mixture was stirred for 6 hours at 0° C. and pH2 to give a solution of 8-(2-sulpho-5-[dichloro-s-triazinylamino]phenylazo)-7-amino-1-hydroxynaphthalene-3-sulphonic acid.

Stage b

Tris (β-aminoethyl) amine (1.31 g) was added to the product of stage a) and the mixture was stirred at 50° C. and pH 9.5 for 4 hours. After cooling to 20° C. the mixture was screened and salt (20% w/v) was added to the stirred filtrate. The sodium salt of the precipitated title product was collected and dried.

EXAMPLE 18

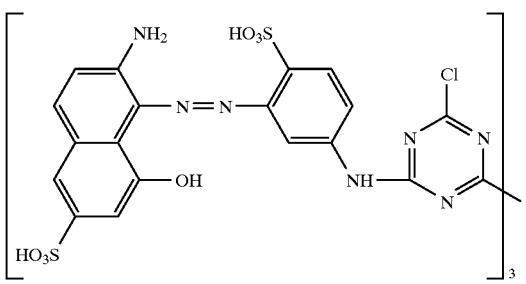

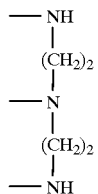

Example 17 was repeated except that in place of the tris (β-aminoethyl)amine there was used diethylene triamine.

The title dye was obtained in a yield of 8.6 g, λmax 536 mn.

The title dye may be applied to cotton by exhaust dyeing under alkaline conditions.

EXAMPLE 19

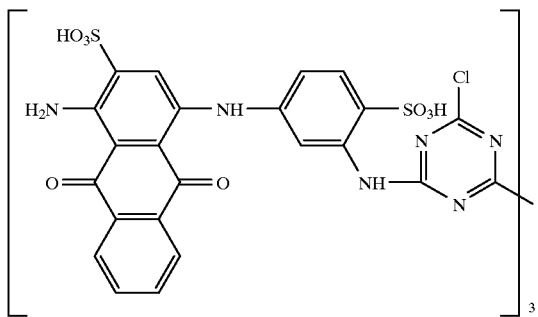

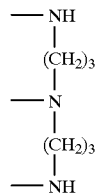

A solution of 1-amino-4-(3'-dichloro-s-trazinylamino-4'-sulphophenylamino) anthraquinone-2-sulphonic acid (0.03 moles) was dissolved in water. Tris (β-aminoethyl) amine (1.31 g, 0.009 moles) was added and the mixture was heated to 50° C. and stirred at pH 9.5 for 5 hours. The pH was lowered to 6.5 and the mixture allowed to cool to room temperature. Salt (20% w/v) was added with stirring and the resultant precipitate was collected and dried to give the title product as its sodium salt (12.5 g). The title dye had a λ max at 580 mn.

I claim:

1. A process for coloring a substrate, comprising:

applying to a substrate, at a pH above 7, a water-soluble reactive dye of the formula $N(Z)_3$, wherein each Z independently is a group of the formula (III):

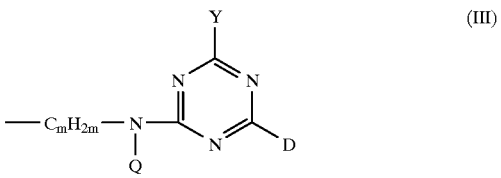

wherein:

m is from 1 to 6;

Q is H, optionally substituted alkyl or alkylene;

Y is a labile atom or group; and

D is a chromophoric group.

2. A process according to claim 1 wherein the water-soluble reactive dye is applied to the substrate at a pH above 7 by exhaust dyeing, padding or printing.

3. A water-soluble reactive dye of the formula $N(Z)_3$ wherein each Z independently is of the formula (III):

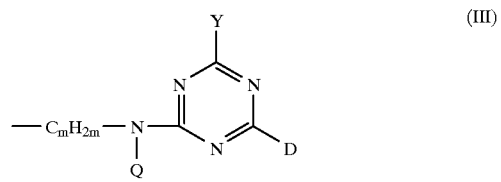

wherein:

m is from 1 to 6;

Q is H or optionally substituted alkyl;

Y is a labile atom or group; and

D is a chromophoric group.

* * * * *